3,297,649
PROCESS FOR CURING POLYURETHANES
Frederick George Kirschner, Bristol, R.I., assignor to Rohm & Haas Company, Philadelphia, Pa., a corporation of Delaware
No Drawing. Filed Nov. 13, 1962, Ser. No. 237,350
7 Claims. (Cl. 260—75)

This invention relates to polyurethanes and, more particularly, to a polyurethane suitable for threads, filaments, foams, films and coatings having improved properties.

The preparation of a variety of plastic materials from polyurethanes is now well known to the art. Suitable elastomers may be prepared by reacting either a polyester or a polyether with a diisocyanate to prepare a prepolymer and then curing the prepolymer to provide urea linkages. Elastomeric threads prepared from such materials are termed "spandex" fibers and have found wide use in all those areas wherein elastomeric filamentary material is desired. They have been found particularly suitable in the preparation of women's garments wherein their premium properties are particularly useful. Heretofore these materials have suffered from a major defect, namely, lack of light-fastness. When used for undergarments, this lack has not been critical, but it has severely limited the use of spandex fibers for bathing suits and such, where this drawback in present spandex fibers constitutes a major difficulty.

Polyurethanes are also widely used as foams. In such a use a hydroxyl-terminated polymer (generally a polyether) is reacted with a polyisocyanate compound having two or more isocyanato groups per molecule. The resulting compound is then cured with water to provide $CO_2$ causing the resin to foam. Alternatively, other blowing agents may be used to obtain the desired cured foam. The foams so obtained may be rigid or flexible and have open or closed cells at the selection of the formulator. At precent such foams are largely limited to uses which minimize irradiation by sunlight or other light sources rich in actinic rays. Thus, for example, such foams cannot be effectively used in automobile sun visors and similar uses unless shielded by an opaque covering because of the excessive yellowing incident such a use. Similarly, this same deficiency limits the usefulness of polyurethanes in formulating white or pastel-pigmented paints, as a binder for xerographic binder plates and other uses where the excessive yellowing is detrimental.

Accordingly, one object of the invention is to provide a polyurethane having vastly improved resistance to light.

Still another object of the invention is to provide a spandex fiber having vastly improved light stability.

Another object of the invention is to provide a method of making a polyurethane from a prepolymer which has a reasonably long pot life.

Again, an object of the invention is to provide a superior polyurethane suitable for foams, spraying, coating, film-forming, extrusion and thread-making.

Still another object of the invention is to provide a novel polyurethane having the desired colored stability built into the molecule of the polyurethane itself.

A further object of the invention is to provide a process of curing polyurethane with water whereby the $CO_2$ generated in the curing is easily controlled.

These and other objects of the invention will be apparent in the following description of the invention.

These objects are accomplished by the present invention which provides for curing the polyurethane prepolymer with a curing agent containing water or an amine as the primary curing agent to provide urea groups in the cured polymer and an organic difunctional or trifunctional thiol so as to provide a controlled amount of thiocarbamate groups in the cured polymer. It has been found that a polyurethane so prepared has substantially improved light fastness without loss in desirable elastomeric and other physical properties as would be the result in U.S. 2,813,775 to Steuber or in U.S. 2,813,776 to Koller wherein a difunctional compound having —SH groups is used as the sole curing agent. Further, the high reactivity of the —SH compounds employed by Steuber and Koller would indicate that they would not be effective to improve light fastness. In a preferred embodiment of the invention, water is used as the primary curing agent to which is added the thiol.

Previously what color stability polyurethanes possessed was imparted by physically blending the resin with dyes, pigments, stabilizers, etc., or by an extremely time-consuming reaction with a monoisocyanate as disclosed by Wilson in U.S. 2,921,866. As described by Wilson, a reaction time of 24 hours was required to reduce the rate of yellowing (as defined by Wilson) to one third for a readily available isocyanate, with this time being reduced to one hour by the combined use of higher temperature, higher concentration of isocyanate and a high catalyst concentration. In contrast, the method of the instant invention improves the rate of discoloration by over five with no additional processing time.

The polyesters suitable for use in the present invention are of relatively low molecular weight having a molecular weight below that which is required for filament formation. In general, the suitable polyesters have a molecular weight of from about 1500 to about 5000 and are liquid or have a low melting point generally not substantially in excess of 100° C. The polyesters are formed from glycols and dicarboxylic acids, or ester-forming derivatives thereof, by a simple condensation reaction and the resulting products are primarily linear although small amounts of cross-linking agents such as tricarboxylic acids, glycerol or unsaturated acids may be used to impart selected properties to the final product. Saturated aliphatic dicarboxylic acids such as adipic, succinic, glutaric, pimelic, suberic, azelaic, sebacic, malonic and the like may be employed with aliphatic glycols such as ethylene glycol, diethylene glycol, triethylene glycol, decamethylene glycol and 1,12-octadecanediol. Aromatic acids such as isophthalic, p-phenylenediacetic acid, etc., and alicyclic acids such as hexahydroterephthalic acid may likewise be used. Where an elastomeric polyurethane is desired, it is preferred to limit the use of aromatic acids to those instances where the polyisocyanate is an aliphatic diisocyanate. An excess of the glycol is used so that the polyester has terminal alcoholic hydroxyl groups. The polymerization may be carried out without catalysts or, if desired, known esterification catalysts such as toluene sulfonic acid, etc., can be used to hasten the reaction.

As an alternative to the polyesters, or in conjunction therewith, there may be used one or more polyethers. Such polyethers are anhydrous chain-extended polyethers having ethereal oxygen atoms separated by hydrocarbon chains either aliphatic or aryl in nature. The ether should also contain terminal groups reactive to isocyanate, such as alcoholic hydroxyl groups. Such materials are generally linear in structure, but may be branched somewhat. The preferred ethers contain the structure $H(OR)_nOH$, wherein R is a hydrocarbon radical and $n$ is an integer sufficiently high to give a molecular weight to the product of from about 200 to 5000 and preferably within the range of from about 750 to 4000. Again, however, the molecular weight may be increased or decreased to somewhat modify the final product as long as the desired nature of the final cured polyurethane is retained. Polyethers are particularly preferred in preparing polyurethane foams. The polyethers include polypropylene or polyethylene glycols with a molecular weight of up to about 4000, polyethers prepared by reacting propylene oxide and/or ethylene oxide with various polyols as trimethylol propane, hexenetriol or with a diol as pentanediol-1,5,2-ethylpropanediol-1,3, etc.

The polyethers can be used to fully replace or replace in part the polyesters. Thus, in referring to the polyesters and polyethers in the following discussion, it is to be understood that mixtures are encompassed containing both polyester and polyether groups.

Further examples of suitable polyesters and polyethers for forming the prepolymer of the present invention are described in United States Patents 2,814,606, 2,801,648, 2,801,990, 2,777,831, 2,606,162 and 2,432,148. The patents also teach the method of preparing such polymers.

The polyester or polyether is reacted with a polyisocyanate, preferably a diisocyanate, to give a suitable prepolymer. An excess of diisocyanate over that required to react with the hydroxyl groups of the polyester or polyether is used so that the resulting prepolymer contains from about 2 to about 8% free NCO groups, while from about 2 to about 6% is preferred in producing elastomeric polyurethanes, while larger amounts of NCO groups are used to produce foams and in various other uses. Too low a concentration of free NCO results in a polyurethane having inferior tensile strength and modulus while too high a concentration of free NCO in the prepolymer results in a polyurethane possessing undesirable elongation. While aliphatic, alicyclic and aromatic diisocyanates are all useful in preparing polyurethanes, the problem of yellowing on aging is largely limited to those polyurethanes prepared from the aromatic diisocyanates. By reason of their cheapness and availability the aromatic diisocyanates have almost preempted the market. Among the aromatic diisocyanates most widely used are the tolylene diisocyanates, naphthalene diisocyanates, p,p,-diphenylmethane diisocyanate and the like. Higher polyisocyanates, as triisocyanates, may also be used as the sole source of isocyanato groups or in admixture with a diisocyanate depending on the properties desired in the final product. The process of the invention is particularly useful when an aromatic polyisocyanate is used.

The prepolymer is formed by reacting the polyester or polyether with the diisocyanate under anhydrous conditions at a slightly elevated temperature. In general, a temperature of from about 50° C. to about 150° C. is employed, although temperatures somewhat lower can be used with an undesirable increase in reaction time. When employing a temperature within the range of 50° C.–150° C., a reaction time of about 5 to about 60 minutes is generally required with the lower temperatures requiring the longer time interval. Desirably a catalyst such as tin octoate is used.

Upon the formation of the prepolymer, it may be dissolved in an inert organic solvent (i.e., one which does not react with the free NCO groups of the prepolymer) if it is to be processed into a film or fiber. The concentration of prepolymer in the solvent is not at all critical but to avoid unduly large solvent recovery costs it is preferred that the solution be quite concentrated. The amount and nature of the solvent will vary, depending upon whether the resulting solution is to be sprayed, extruded or cast. Generally, such solutions contain from about 2 to about 85% polymer based on the weight of the solution. In some uses such as foams, no solvent is used. A relatively inexpensive, inert and very satisfactory solvent for the prepolymer is 1,1,1-trichloroethane which boils at about 74° C., although other volatile solvents such as carbon tetrachloride, chloroform, other halogenated hydrocarbons, ethers, aromatic hydrocarbons, and, in general, any inert organic solvent, etc., may likewise be used. Where the solution is to be extruded or cast without formation of foam, it is also desirable to use a solvent which is able to absorb $CO_2$, e.g., acetonitrile, dimethylacetamide, etc.

Dyestuffs, pigments, fillers, softeners etc., can be added during all processing steps without any difficulties. It is desirable, however, that such additives be incorporated in the prepolymer prior to subsequent processing. In addition to modifying the softness, color and other properties of the product, certain additives give rise to improved mechanical properties in the cured products. Thus, where a black color can be tolerated in the final product, carbon black has been found to significantly improve the tear resistance of the product, antimony oxide has been found to impart flameproofing properties, silica has been found to increase the modulus, and pigments such as titanium dioxide and zinc oxide have been found to desirably increase the whiteness of the resulting material.

The prepolymer itself has a pot life of several months. Upon incorporation of solvent and pigments the resulting mixture has a pot life of several weeks. This stability, of the prepolymer is highly desirable in increasing the flexibility of factory processing and scheduling operations.

Curing agent including the thiol is then added to the prepolymer to obtain a "built-up prepolymer" having a controlled amount of thiocarbamate linkages to impart the desired light stability without detracting from the desired physical properties of the polyurethane. Desirably a catalyst is used to promote the reaction with the curing agent. If a catalyst is used, it is essential that it be added after the curing agent.

By "curing agent" is meant a polyfunctional compound reactive with the isocyanato group to chain-extend and cross-link the prepolymer. Difunctional curing agents are preferred. In accordance with the invention, the curing agent contains a thiol as described below. In addition, the curing agent also contains, as the primary material to cure the resin, water or a diamine which reacts with the isocyanato group to provide a urea linkage. Urea linkages in most instances impart hardness and higher tensile strength to the resin. It is preferred to use water as the primary curing agent.

The thiocarbamate linkages are provided by adding to the prepolymer the correct amount of a thiol. Desirably the thiol is worked into the prepolymer in a solvent solution so as to obtain uniform and complete dispersion of the thiol in the prepolymer. Despite the reactivity of the free NCO groups it has been found that the prepolymer solution containing the thiol dissolved therein has a pot life of several days. Preferably the thiol is a difunctional thiol, by which is meant an organic compound having two groups containing reactive hydrogen (i.e., hydrogen reactive with an isocyanate group) at least one of the groups being a thiol. Optionally a trifunctional thiol may be used, though in this case care should be taken to avoid excessive amounts which would result in undue cross-linking of the resin. It is most preferred to use a dithiol. For use in the present invention the thiol must be aliphatic. By "aliphatic" is meant not only open-chain carbon compounds, but also cyclic carbon compounds whose properties are aliphatic rather than aromatic. Suitable thiols include: 1,3-butylene dithiol, 1,6-hexane dithiol, decamethylene dithiol, p-menthane dithiol, glycol dimercaptoacetate, 2-mercaptoethanol, 1-thioglycerol, etc. Where the thiol contains hydroxyl groups, the hydroxyl groups react with the isocyanato groups to provide additional urethane linkages. The concentration of the thiol should be such that the resulting polymer contains from about 10 to about 40 thiocarbamate linkages per 100 combined urethane and urea linkages.

Any of the diamines conventionally used by the art may be used as the primary curing agent in place of water. Such diamines and their use are described in U.S. 3,055,871 to Heffler et al. In this general description of the invention, only water will be referred to as the primary curing agent, but it is understood that a diamine may also be used. It is preferred to add the water after the thiol has been completely distributed throughout the prepolymer. However, this is not critical and, if desired, the water may be added prior to or concurrently with the thiol. The water can be emulsified in the prepolymer solution or, if desired, water may also be added in an organic solution to facilitate its uniform distribution throughout the prepolymer solution. A suitable common solvent, for example, is acetonitrile. The addition of water results in no immediate viscosity increase, the mixture having a pot life of better than 5 hours, thus permitting the handling of the mixture and its further processing. The amount of water and thiol should be slightly less than the amount needed to completely react with the free NCO groups, i.e., the combined amount of water and thiol is insufficient to completely react with all of the free NCO groups in the prepolymer. Desirably the reaction is carried as far as possible without gelation, i.e., the reaction desirably is carried to about the point of incipient gelation. By reducing the amount of free NCO groups as much as possible while maintaining the resulting polymer in solution, difficulties from $CO_2$ evolution are minimized. At this stage the resin is termed a "built-up prepolymer."

A small amount of a strong catalyst such as tertiary amine is then added to the prepolymer solution. The catalyst is added as a very dilute solution in an organic solvent. The tertiary amine catalyst initiates the reaction with the thiol and the water immediately, but since the catalyst is added as a very dilute solution with continuous stirring, the reaction proceeds homogeneously without gelation. The use of tertiary amine catalysts is described, inter alia, in U.S. 2,650,212 to Windemuth. Such catalysts include, for example, trialkyl amines such as triethylamine, dimethyl piperazine, tetramethyl ethylenediamine, dimethylaminocyclohexane, perhydroethylcarbazole, quinoline, methyl- or butyl-pyrrolidine, etc.

The final curing of the built-up prepolymer utilizes moisture to form urea linkages. If desired, thiol may be used in addition to or in place of the water. This final curing is carried out slowly so that rapid $CO_2$ evolution and consequent entrapment of gas bubbles does not occur. By carrying out the curing from the prepolymer to a built-up prepolymer while in the liquid state and then completing the final curing as a subsequent step, the $CO_2$ evolution is easily controlled, giving a final polymer free from the weaknesses and defects caused by entrapped $CO_2$ bubbles. Also it has been observed that curing with a mixture of thiol and water appears to give smoother, less troublesome evolution of $CO_2$ as compared to the same process using water alone. Further, by initiating the chain-extending reaction in the liquid state (as contrasted to the gel or solid state), it is believed that during the mobile period of the reactants the molecules orient themselves under the influence of the secondary valence forces resulting in a final product having better physical properties. However, it is not intended to be limited to this or any other theory.

The final curing of the built-up prepolymer will depend on the purpose or use made of the resulting cured polymer. If it is desired to handle the built-up propolymer immediately, this can be done by treating the surface of the build-up prepolymer with a mixture of thiol, water and tertiary amine thereby forming a non-tacky "skin" permitting immediate handling. Such treatment is particularly desirable where the built-up prepolymer is to be extruded into a thread, coated on a fabric, or cast to form a film. If the material is to be extruded as in producing a thread, built-up prepolymer is drawn through a set-up bath containing a solution of a thiol, water and a tretiary amine catalyst. Upon leaving the bath the material is then washed, subjected to the final moisture cure and dried. In an alternative procedure, the thread is extruded into a first solution of thiol and catalyst in chlorothene, high boiling naphtha and acetonitrile. The chlorothene is used in sufficient concentration to give a solution having a density of at least about 1.2 so the thread will float, the naphtha reduces the solubility of the resin in the solvent mixture, and the acetonitrile both assists penetration of the curing agents into the thread and dissolves any $CO_2$ formed. The thread is then led into a second bath of catalyst and water and then dried. The catalyst in both baths is a tertiary amine.

If the built-up prepolymer is to be used to coat a fabric, the fabric may be first moistened with a solution of a thiol, water and a tertiary amine catalyst and the built-up prepolymer solution then applied to the moistened fabric, where it forms a layer on the fabric. Alternatively, the prior impregnation of the fabric may be omitted and the dry fabric may be directly impregnated with the built-up prepolymer solution as by spraying, dipping, etc. The resin may then be cured by atmospheric moisture, etc. Where it is desired to cast a film, the built-up prepolymer solution is cast and the film cured under an atmosphere created by vaporizing a thiol, water and a tertiary amine catalyst.

The solution of curing agents used to produce the non-tacky skin desirably contains from about 0.5 to about 5% thiol, from about 5 to about 30% water and the remainder an organic solvent, particularly one which is able to absorb $CO_2$ such as acetonitrile. The amount of tertiary amine catalyst can vary widely, depending upon the catalytic ability of the material. In the case of tetramethyl ethylenediamine the concentration is from about 0.1 to about 10% by weight. It has been found that too small an amount of thiol results in an undesirably slow cure while too large an amount of thiol results in poor physicals.

While it is desirable to introduce a controlled amount of thiocarbamate linkages in the built-up prepolymer, to obtain the maximum color stability, it is also within the scope of the invention to omit the thiol in producing the built-up prepolymer, and utilize a curing solution containing the thiol, water and catalyst as herein described to produce the desired concentration of thiocarbamate linkages in the surface of the elastomer to thereby impart the desired light stability to the surface without significant alteration of physical properties. It is also evident that a larger concentration of thiocarbamate linkages may be produced on the surface of the material than could be tolerated in the bulk of the material without resulting in significantly inferior physical properties.

This invention is furthermore illustrated by the following examples without however, being restricted thereto. All parts are by weight unless otherwise specified.

*Example I*

In this example there is used a commercial prepolymer solution obtained under the trade name Adiprene L. This material is a polyether-diisocyanate reaction product having 8% free NCO groups and is prepared from polytetramethylene ether glycol and tolylene diisocyanate. The resin is described in "Rubber Age," volume 89, No. 2, for May 1961, in an article by A. J. Sampson et al. To 100 parts of the prepolymer are added 9.0 parts of methylene-bis-o-chloroaniline and 0.7 part of glycol dimercaptoacetate dissolved in acetonitrile. After the reactants are thoroughly worked into the prepolymer solution, the resin is cast and dried for 8 days at atmospheric temperature and humidity. The resulting product is found to have an elongation of 450, zero break set, a 300% modulus of 1700 and a tensile strength of 8000 lbs./sq.in.

*Example II*

Example I is repeated, but omitting the glycol dimercaptoacetate and adding one additional part of methylene-bis-o-chloroaniline therefor. The resulting resin solution is cast and dried in a dry oven for 3 hours at 100° C. The resulting product has an elongation of 450, a break set of 5%, a 300% modulus of 2100 and a tensile strength of 4500 lbs./p.s.i.

*Example III*

The products produced in Examples I and II are then subjected to the action of direct sunlight out of doors. It is then found that the product of Example II containing no thiol in the curing agent and hence no thiocarbamate linkages in the cured polyurethane shows substantial discoloration after about one day's exposure. On the other hand, the product produced in Example I shows no visible discoloration after five days of continued outdoor exposure to direct sunlight.

In addition to the pigments and fillers shown in the above examples, any such material normally used in formulating polyurethane resins may be used as, for example, ultramarine blue, iron oxides, chrome oxide, cadmium sulfide, zinc sulfide, antimony sulfide, phthalocyanines, etc.

In addition to the excellent discoloration resistance imparted by the instant invention, it has been found that the built-up prepolymers set up at room temperature and under ambient humidity at a significantly faster rate than compositions similarly prepared but omitting the thiol.

The process of the invention is particularly applicable to the formulation of polyurethane resins for use as films, fibers, coatings, etc. which resins are characterized by improved resistance to discoloration by sunlight without loss in other desirable physical properties, all as described above. The process of the invention is equally applicable to the formulation of polyurethane resin foams wherein the addition of a controlled amount of a polyfunctional aliphatic or alicyclic thiol to the water curing agents in the conventional foaming process may be used.

What is claimed is:

1. A process for producing a polyurethane characterized by improved resistance to discolorization by sunlight, said process comprising reacting with a curing agent a polyurethane prepolymer prepared by reacting a polymer containing terminal hydroxyl groups and having a melting point not greater than about 100° C. with at least one aromatic polyisocyanate, the polyisocyanate providing an excess of isocyanato groups over the terminal hydroxyl groups of the polymer so that the prepolymer contains free isocyanato groups, said curing agent containing
   (a) a primary curing agent selected from the group consisting of water and an organic diamine having two primary amino groups, and
   (b) an aliphatic thiol selected from the group consisting of difunctional and trifunctional thiols, whereby the resulting polymer contains from about 10 to about 40 thiocarbamate linkages per 100 combined urethane and urea linkages.

2. The process according to claim 1 wherein the primary curing agent is water.

3. The process according to claim 1 wherein the primary curing agent is water and the thiol is a dithiol.

4. The process according to claim 1 wherein the primary curing agent is a diamine and the thiol is a dithiol.

5. The polyurethane produced according to the process of claim 1.

6. A process for producing an elastomeric polyurethane characterized by excellent resistance to discoloration from sunlight, said process comprising reacting a hydroxyl-terminated polymer selected from the group consisting of polyesters and polyethers with an excess of an aromatic diisocyanate so that the resulting reaction product contains from about 2 to about 8% free isocyanato groups and curing said isocyanato-containing polymer with a curing agent containing
   (a) a primary curing agent selected from the group consisting of water and an organic diamine having two primary amino groups, and
   (b) an aliphatic thiol selected from the group consisting of difunctional and trifunctional thiols, whereby the molecules of the resulting polymer contain from about 10 to about 40 thiocarbamate linkages per 100 combined urethane and urea linkages.

7. A method according to claim 6 wherein the thiol is a dithiol.

References Cited by the Examiner

UNITED STATES PATENTS

| | | | |
|---|---|---|---|
| 2,517,694 | 9/1950 | Merion et al. | 161—173 |
| 2,621,166 | 12/1952 | Schmidt et al. | 260—75 |
| 2,657,151 | 10/1953 | Gensel et al. | 260—75 |
| 2,676,164 | 4/1954 | Charlton | 260—75 |
| 2,755,266 | 7/1956 | Brenschede | 260—75 |
| 2,801,990 | 8/1957 | Seeger et al. | 260—75 |
| 2,843,568 | 7/1958 | Benning et al. | 260—77.5 |
| 2,929,800 | 3/1960 | Hill | 260—77.5 |
| 3,058,955 | 10/1962 | Neumann et al. | 260—77.5 |
| 3,135,646 | 6/1964 | Hayden | 161—173 |

LEON J. BERCOVITZ, *Primary Examiner.*

J. J. KLOCKO, *Assistant Examiner.*